(12) United States Patent
Xu

(10) Patent No.: US 10,717,929 B2
(45) Date of Patent: Jul. 21, 2020

(54) IONIC LIQUID FLAME RETARDANTS

(75) Inventor: Yanjie Xu, Longmont, CO (US)

(73) Assignee: IONIC FLAME RETARDANT INC., Longmont, CO (US)

( * ) Notice: Subject to any disclaimer, the term of this patent is extended or adjusted under 35 U.S.C. 154(b) by 982 days.

(21) Appl. No.: 12/947,377

(22) Filed: Nov. 16, 2010

(65) Prior Publication Data

US 2011/0073331 A1  Mar. 31, 2011

Related U.S. Application Data

(63) Continuation-in-part of application No. 12/806,267, filed on Aug. 9, 2010.

(60) Provisional application No. 61/274,031, filed on Aug. 11, 2009.

(51) Int. Cl.

| | |
|---|---|
| A62C 2/00 | (2006.01) |
| C09K 21/10 | (2006.01) |
| D06M 13/352 | (2006.01) |
| D06M 13/44 | (2006.01) |
| D21H 21/34 | (2006.01) |
| C07F 9/54 | (2006.01) |
| C09K 21/06 | (2006.01) |
| C09K 21/12 | (2006.01) |
| D06M 13/244 | (2006.01) |
| D06M 13/355 | (2006.01) |
| C08L 9/02 | (2006.01) |

(52) U.S. Cl.
CPC ............ *C09K 21/10* (2013.01); *C07F 9/5407* (2013.01); *C09K 21/06* (2013.01); *C09K 21/12* (2013.01); *D06M 13/244* (2013.01); *D06M 13/352* (2013.01); *D06M 13/355* (2013.01); *D06M 13/44* (2013.01); *D21H 21/34* (2013.01); *C08L 9/02* (2013.01); *D06M 2200/30* (2013.01)

(58) Field of Classification Search
CPC ........ C09K 21/10; C09K 21/06; C09K 21/12; C07F 9/5407; D06M 13/244; D06M 13/352; D06M 13/355; D06M 13/44
USPC ........... 252/607, 608, 609; 548/341; 558/70; 524/148, 105, 86, 236; 564/289
See application file for complete search history.

(56) References Cited

U.S. PATENT DOCUMENTS

| | | | | |
|---|---|---|---|---|
| 4,419,401 A | * | 12/1983 | Pearson | ................. 442/142 |
| 4,943,380 A | * | 7/1990 | Sugiura | ................. C08K 5/50 |
| | | | | 260/DIG. 16 |
| 5,300,621 A | * | 4/1994 | Inata | ................. C08G 63/181 |
| | | | | 528/176 |
| 2004/0099178 A1 | | 5/2004 | Jones | |
| 2004/0220309 A1 | | 11/2004 | Nishimi et al. | |

(Continued)

FOREIGN PATENT DOCUMENTS

| | | | | |
|---|---|---|---|---|
| EP | 1882717 A1 | * | 1/2008 | ............ C08F 290/00 |
| GB | 7918421 | | 12/1979 | |
| JP | 60017749 | | 8/1986 | |

*Primary Examiner* — Vincent Tatesure
(74) *Attorney, Agent, or Firm* — Lathrop GPM LLP

(57) ABSTRACT

The present invention relates to the use of ionic liquids as flame retardants. The compounds of the invention may be used as flame retardants in various materials without causing damage to the environment and or health of humans or animals. Ionic liquid flame retardants maybe applied alone or in combination with traditional flame retardants. Ionic liquid flame retardants can be applied to finish textile, plastic, leather, paper, rubber or as wild fire flame retardants.

7 Claims, 3 Drawing Sheets

(56) References Cited

U.S. PATENT DOCUMENTS

| | | |
|---|---|---|
| 2005/0014644 A1* | 1/2005 | Ray .................. B41C 1/1016 |
| | | 503/201 |
| 2006/0090271 A1* | 5/2006 | Price et al. .................. 8/490 |
| 2006/0100323 A1* | 5/2006 | Schmidt .................. C08K 5/19 |
| | | 524/106 |
| 2008/0194831 A1 | 8/2008 | Ignatyev et al. |
| 2010/0209782 A1 | 8/2010 | Choi et al. |

* cited by examiner

IONIC LIQUID FLAME RETARDANTS

CROSS REFERENCE TO RELATED APPLICATIONS

This application is a Continuation-In-Part of U.S. Non-Provisional application Ser. No. 12/806,267 filed on Aug. 9, 2010 which claims the benefit of U.S. Provisional Application No. 61/274,031 filed on Aug. 11, 2009 both of which are incorporated herein in their entirety.

FIELD OF THE INVENTION

The present invention is broadly directed to novel flame or fire retardant compositions including ionic liquids.

BACKGROUND OF THE INVENTION

Flame retardants are chemical additives which may be used across a variety of consumer products, such as plastics, textiles, leather, paper, rubber, etc. Chemicals which may be used as flame retardants can be mineral, halogen containing, nitrogen containing and phosphorus containing chemicals, silicon based chemicals, etc. The term "retardant" represents a class of use and not a class of chemical structure.

Preventive flame protection, including the use of flame retardants, has been practiced since ancient times. For example, alum was used to reduce the flammability by Egyptians at the time of about 540 BC. The advent of synthetic polymers earlier last century was of special significance, since the water soluble inorganic salts used up to that time were of little or no utility in these largely hydrophobic materials. Modern developments were, therefore, concentrated on the development of polymer compatible flame retardants. Wild forest fires comprise a serious problem, burning thousands of hectares all over the world each year. Diammonium phosphate (DAP), monoammonium phosphate (MAP), ammonium polyphosphate (APP) and ammonium sulphate (AS) have been used as long-term flame retardants. They are regarded as long-term flame retardants, because they can inhibit combustion even after the loss of their water matrix.

Fundamentally, four processes are involved in polymer flammability: preheating, decomposition, ignition and combustion and propagation. Flame retardants interfere with combustion during a particular stage of this process, i.e. during heating, decomposition, ignition or flame spread through physical or chemical actions.

There are several ways in which the combustion process can be retarded by physical action: for example cooling, formation of a protective layer/coating and/or dilution. During cooling action endothermic processes triggered by flame retardants may cool the material to a temperature below that required to sustain the combustion process. By formation of a protective layer/coating, a condensed combustible layer may be shielded from the gaseous phase with a solid or gaseous protective layer. A condensed phase is thus cooled, smaller quantities of pyrolysis gases are evolved, the oxygen necessary for the combustion process is excluded and heat transfer is impeded. By dilution, the incorporation of inert substances (e.g., fillers) and additives that evolve inert gases on decomposition may dilute the fuel in the solid and gaseous phases so that the lower ignition limit of the gas mixture is not exceeded.

Flame retardants may impede combustion by providing chemical reactions which interfere with combustion processes occurring in the solid and/or gas phases. For reactions in the gas phase, a free radical mechanism of a combustion process which takes place in the gas phase is interrupted by a flame retardant. Exothermic processes may thus be stopped, the system cools down, and the supply of flammable gases is reduced and eventually completely suppressed. For reactions in the solid phase, two types of reaction may take place. Firstly, breakdown of a polymer may be accelerated by a flame retardant, causing pronounced flow of a polymer and, hence, its withdrawal from the sphere of influence of the flame, which breaks away. Secondly, a flame retardant may cause a layer of carbon to form on a polymer surface. This can occur, for example, through the dehydrating action of the flame retardant generating double bonds in the polymer. These may form a carbonaceous layer by cyclizing and cross-linking.

In recent years, there are growing concerns about the safety of these flame retardant chemicals. An issue with the above mentioned forest flame retarding chemicals are their impact on the environment. Initially it was thought that these flame retardants would have no adverse on the environment, as their main active ingredients are agricultural fertilizers. However, ammonia, coming from the dissociation of the ammonium salts, is regarded as extremely toxic. Ecotoxicological studies were performed to understand the effects of long-term forest fire retardants on enzymatic activities, cells and microorganisms, thereby obtaining LC50 levels (lethal concentration). The LC50 value of ammonia is 0.53-4.94, which is extremely toxic. Toxicity studies on aquatic organisms relate the results obtained to the determined amount of flame retardants and ammonia. The data show that ammonia is the component that has most impact on these organisms under the testing conditions.

Brominated flame retardants, such as polybrominated diphenylethers (PBDEs), were first introduced into the consumer marketplace in the 1970s. They showed great compatibility with plastics and textiles, and offered superior flame retardant properties. Brominated flame retardants interrupt combustion by volatizing bromine radicals to react with high energetic free radicals O. and .OH from the combustion, thereby preventing the spread of the flame. The most commonly used brominated flame retardants are PBDEs and tetrabromobisphenol A (TBBPA). By 2010, the brominated flame retardants market is projected to reach 1.7 billion pounds. Market Report by Peter Dufton; 2003.

Great efforts are being put into developing halogen free flame retardants, especially phosphorus based flame retardants. However, their flame retarding performance is not satisfactory. The prior art describes the use of some phosphonium ion salts. Doring et al describe polyphosphonium cations with selected anions as flame retardants in application US20100160476. Japanese patent application JP 2010163396 describes straight chain alkylaryl phosphonium salt structures as polymer dopants for high conductivity, heat resistance and flame retardancy. Tan et al, Faming Shuanli Shenqing Gongkai Shuomingshu, CAPLUS AN 2010: 740737 (Patent), Jun. 9, 2010, reported fireproofing agent containing quaternary phosphonium salt-modified montmorillonite as flame retardants. A review by Guo et al, Zhongguo Pige, 2004, CAPLUS AN 2005:551561 describes development and applications of tetrakis(hydroxymethyl) phosphonium salts as flame retardants for textiles, leather tanning agents, bactericides for wastewater treatment, etc. Ammonium surfactants have been employed to modify the surface of nanoclays for flame retarding applications.

Despite health and environmental concerns, the world flame retardant chemicals market is projected to reach 5.7 billion pounds by the year 2012. The United States is the country with the tightest flame safety standards, and consequently the greatest use of brominated flame retardants. Nearly 98 percent of roughly 8,500 metric tons of PBDE used globally is consumed in US. However, brominated flame retardants are not chemically bound to the textiles and many substrates in plastic composites; therefore, they may easily escape into environment. There is growing concern over the persistence and bioaccumulation of brominated flame retardants and their risk to the environment and human health. Since brominated flame retardants are lipophilic and bioaccumulative substances, they may build up in fatty tissues once they enter a human or animal body. Studies have found bromated flame retardants to be widespread in the environment and in human tissues. Studies also have shown that these brominated flame retardants are toxic and can cause serious health disorders. In addition, women in North America have the highest levels globally of these chemicals in their breast milk.

The foregoing examples of the related art and limitations are intended to be illustrative and not exclusive. Other limitations of the related art will become apparent to those of skill in the art upon a reading of the specification and a study of the drawings or figures as provided herein.

SUMMARY OF THE INVENTION

Therefore a continuing need exists for flame retardant compounds that are environmentally benign and nonmigrating. Ionic liquids show excellent resistance to migration and leaching and do not accumulate in fatty tissue causing toxicity. Additionally, incorporating biodegradable groups can make ionic liquids ready biodegradable and completely non-toxic. The following embodiments, aspects and variations thereof are exemplary and illustrative and not intended to be limiting in scope.

In one embodiment, there is provided a method for preparing a flame retardant material comprising contacting or formulating the material with a flame retarding composition comprising an ionic liquid compound of the formula:

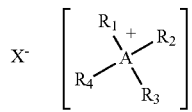

1 wherein A is selected from N, P or S; and wherein
i) when A is N, each $R_1$, $R_2$, $R_3$ and $R_4$ independently form a double bond with N and an adjacent $R_1$, $R_2$, $R_3$ or $R_4$ group or are each independently selected from the group consisting of hydrogen, $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, cyano, —SMe, —$SO_3H$, —$P((C_1-C_5)alkyl)_2$ and —$P(O)(OEt)_2$; or wherein $R_1$, $R_2$ and $R_3$ together with N form a heteroaromatic or $R_1$ and $R_2$ together with N form a heterocyclic ring each unsubstituted or substituted by a group selected from halo, nitro, trifluoromethyl, trifluoromethoxy, methoxy, carboxy, —$NH_2$, —OH, —SH, —$NHCH_3$, —$N(CH_3)_2$, —SMe, cyano, $(C_1-C_3)$alkyl, aryl, $(C_3-C_6)$cycloalkyl, aryl$(C_1-C_3)$alkyl and heteroaryl; provided that when the material is a clay, $R_1$, $R_2$, $R_3$ and $R_4$ are not hydrogen, straight chain unsubstituted $(C_1-C_{20})$alkyl nor combined with N to form a pyrrolidinium ring or piperidinium ring;
ii) when A is S, $R_1$, $R_2$, $R_3$ and $R_4$ are each independently selected from the group consisting of hydrogen, $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, cyano, —SMe, —$SO_3H$, —$P((C_1-C_5)alkyl)_2$ and —$P(O)(OEt)_2$; and
iii) when A is P, $R_1$, $R_2$, $R_3$ and $R_4$ are each independently selected from the group consisting of hydrogen, $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, cyano, —SMe, —$SO_3H$, —$P((C_1-C_5)alkyl)_2$ and —$P(O)(OEt)_2$; or
wherein at least one of $R_1$, $R_2$, $R_3$ and $R_4$ is selected from the group consisting of $(C_1-C_{10})$alkyl substituted with one —Cl, —Br, —I, —CH=CH, —$CH_2CH=CH$, -epoxide, —OC(O)—CH=CH, —NCO, —C(O)Cl, —C(O)Br, —C(O)-imidazolyl, —$CO_2(C_1-C_3)$alkyl, —$OC(O)CH_2C(O)CH_3$ and —CH=$CR_{10}CO_2(C_1-C_3)$ alkyl where $R_{10}$ is H or $CH_3$;
provided that:
a) when A is P, then $R_1$, $R_2$, $R_3$ and $R_4$ are not all hydroxymethyl;
b) when A is N or S, $X^-$ is selected from the group consisting of $[PF_6]^-$, $[NTf_2]^-$, $[BR_5R_6R_7R_8]^-$, $[BF_4]^-$, $OH^-$, $SCN^-$, $SbF_6^-$, $R_9PO_4^-$, $R_9SO_2^-$, $R_9SO_3^-$, $R_9SO_4^-$, $OTf^-$, tris(trifluoromethylsulfonyl)methide, $[N(CN)_2]^-$, $[CH_3CO_2]^-$, $[CF_3CO_2]^-$, $[NO_3]^-$, $Br^-$, $Cl^-$, $I^-$, $[Al_2Cl_7]^-$, $[AlCl_4]^-$, oxalate, dicarboxylates and tricarboxylate, formate, phosphate and aluminate, wherein $R_5$, $R_6$, $R_7$ and $R_8$ are each independently selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, —SMe and cyano, and wherein $R_9$ is selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$ alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, —SMe and cyano;
c) when A is N and at least one of $R_1$, $R_2$, $R_3$ and $R_4$ is —$CH_3$, then the material does not comprise of a clay; and
d) when A is P, then $X^-$ is selected from the group consisting of $[PF_6]^-$, $[NTf_2]^-$, $[BR_5R_6R_7R_8]^-$, $[BF_4]^-$, $OH^-$, $SCN^-$, $SbF_6^-$, $R_9PO_4^-$, $R_9SO_3^-$, $R_9SO_4^-$, $OTf^-$, tris(trifluoromethylsulfonyl)methide, $[N(CN)_2]^-$, $[CH_3CO_2]^-$, $[CF_3CO_2]^-$, $[NO_3]^-$, $[Al_2Cl_7]^-$, $[AlCl_4]^-$, oxalate, dicarboxylate and tricarboxylate, formate, phosphate, I⁻ and aluminate, wherein $R_5$, $R_6$, $R_7$ and $R_8$ are each independently selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —NH₂, —OH, —SH, —NHCH₃, —N(CH₃)₂, —SMe and cyano, and $R_9$ is selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —NH₂, —OH, —SH, —NHCH₃, —N(CH₃)₂, —SMe and cyano; and provided that when the material is a resin and at least one of $R_1$, $R_2$, $R_3$ and $R_4$ is a —(CH₂)ₙ— group where n is 1 to 18, then X⁻ is not $SBF_6^-$, $PF_6^-$, $BF_4^-$, $AlF_6^{3-}$, $CF_3SO_3^-$, $AsF_6^-$, $B[C_6F_5]_4^-$, $B[C_6H_3(C_6H_3(CF_3)_2]_4^-$, $B[C_6H_5]_4^-$, $TiF_6^{2-}$, $TiCl_5^-$, $SnCl_5^-$, $GeF_6^{2-}$, $SiF_6^{2-}$, $NiF_6^{2-}$ or $ZrF_6^{2-}$;

and optionally, wherein X⁻ is a group as defined above that is bonded to a polymer.

In one variation of the above ILs, X⁻ is selected from the group of anions as depicted in FIG. 4. In another variation of the above, the ILs are selected from the group illustrated in FIGS. 1, 2 and 3, wherein X⁻ is as defined above. In a particular variation of the above, A is N, each $R_1$, $R_2$, $R_3$ and $R_4$ independently form a double bond with an adjacent $R_1$, $R_2$, $R_3$ or $R_4$ group. In one variation, when A is P, the material is a resin and at least one of $R_1$, $R_2$, $R_3$ and $R_4$ is a —(CH₂)ₙ— where n is 1 to 18, then X⁻ is not a Br⁻ and Cl⁻.

As disclosed herein, when A is N, each $R_1$, $R_2$, $R_3$ and $R_4$ independently form a double bond with an adjacent $R_1$, $R_2$, $R_3$ or $R_4$ group, means that when A is N, then N is bonded to $R_1$, $R_2$, $R_3$ and $R_4$, and together may form an acyclic ammonium compound, or a cyclic ammonium compound such as an imidazolium, pyridinium, pyridazinium or 1,2,4-triazolium. Similarly, when A is S or P, then S or P is bonded to $R_1$, $R_2$, $R_3$ and $R_4$ and together may form a sulfonium or a phosphonium compound. In one aspect of the method, A⁺ together with $R_1$, $R_2$, $R_3$ and $R_4$ form a compound selected from the group consisting of an ammonium, imidazolium, guanidinium, pyridinium, pyridazinium, 1,2,4-triazolium, triazine, sulfonium, phosphazenium and phosphonium.

In another aspect of the above method, the compound is of the formula 2 or 9:

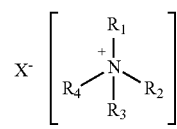

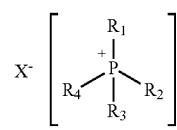

wherein for formula 2, each $R_1$, $R_2$, $R_3$ and $R_4$ independently form a double bond with N and an adjacent $R_1$, $R_2$, $R_3$ or $R_4$ group;

wherein for formula 2 and formula 9, $R_1$, $R_2$, $R_3$ and $R_4$ are each independently selected from the group consisting of hydrogen, $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —NH₂, —OH, —SH, —NHCH₃, —N(CH₃)₂, cyano, —SMe, —SO₃H, —P((C₁-C₅)alkyl)₂ and —P(O)(OEt)₂;

or for formula 2, wherein $R_1$, $R_2$ and $R_3$ together with N form a heteroaromatic or $R_1$ and $R_2$ together with N form a heterocyclic ring each unsubstituted or substituted by a group selected from halo, nitro, trifluoromethyl, trifluoromethoxy, methoxy, carboxy, —NH₂, —OH, —SH, —NHCH₃, —N(CH₃)₂, —SMe, cyano, (C₁-C₃)alkyl, aryl, (C₃-C₆)cycloalkyl, aryl(C₁-C₃)alkyl and heteroaryl; or wherein at least one of $R_1$, $R_2$, $R_3$ and $R_4$ is selected from the group consisting of (C₁-C₁₀)alkyl substituted with one —Cl, —Br, —I, —CH═CH, —CH₂CH═CH, -epoxide, —OC(O)—CH═CH, —NCO, —C(O)Cl, —C(O)Br, —C(O)-imidazolyl, —CO₂(C₁-C₃)alkyl, —OC(O)CH₂C(O)CH₃ and —CH═CR₁₀CO₂(C₁-C₃)alkyl where R₁₀ is H or CH₃; and X⁻ is selected from the group consisting of [PF₆]⁻, [NTf₂]⁻, [BR₅R₆R₇R₈]⁻, [BF₄]⁻, OH⁻, SCN⁻, SbF₆⁻, R₉PO₄⁻, R₉SO₂⁻, R₉SO₃⁻, R₉SO₄⁻, OTf⁻, tris(trifluoromethylsulfonyl)methide, [N(CN)₂]⁻, [CH₃CO₂]⁻, [CF₃CO₂]⁻, [NO₃]⁻, Br⁻, Cl⁻, I⁻, [Al₂Cl₇]⁻, [AlCl₄]⁻, oxalate, dicarboxylates and tricarboxylate, formate, phosphate and aluminate, wherein $R_5$, $R_6$, $R_7$ and $R_8$ are each independently selected from the group consisting of (C₁-C₂₀)alkyl, aryl, (C₃-C₁₀)heterocyclyl, (C₃-C₁₀)cycloalkyl, (C₃-C₁₀)heterocyclyl(C₁-C₈)alkyl, aryl (C₁-C₈)alkyl, heteroaryl and heteroaryl(C₁-C₈)alkyl group that may be unsubstituted or substituted by one or two halo, nitro, trifluoromethyl, trifluoromethoxy, methoxy, carboxy, —NH₂, —OH, —SH, —NHCH₃, —N(CH₃)₂, —SMe and cyano, and wherein $R_9$ is selected from the group consisting of (C₁-C₂₀)alkyl, aryl, (C₃-C₁₀)heterocyclyl, (C₃-C₁₀)cycloalkyl, (C₃-C₁₀)heterocyclyl(C₁-C₈)alkyl, aryl(C₁-C₈)alkyl, heteroaryl and heteroaryl(C₁-C₈)alkyl group that may be unsubstituted or substituted by one or two halo, nitro, trifluoromethyl, trifluoromethoxy, methoxy, carboxy, —NH₂, —OH, —SH, —NHCH₃, —N(CH₃)₂, —SMe and cyano.

In another aspect of the above method, the compound is of the formula:

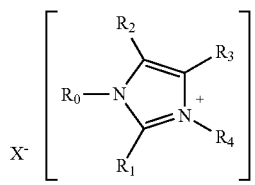

wherein:

$R_0$ is selected from the group consisting of (C₁-C₅)alkyl and aryl that may be unsubstituted or substituted by one or two halo, nitro, trifluoromethyl, trifluoromethoxy, methoxy, carboxy, —NH₂, —OH, —SH, —NHCH₃, —N(CH₃)₂, cyano, —SMe, —SO₃H, —P((C₁-C₅)alkyl)₂ and —P(O)(OEt)₂; and $R_1$, $R_2$, $R_3$ and $R_4$ are each independently selected from the group consisting of hydrogen, $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, cyano, —SMe, —$SO_3H$, —$P((C_1-C_5)alkyl)_2$ and —$P(O)(OEt)_2$; or wherein at least one of $R_0$, $R_1$, $R_2$, $R_3$ and $R_4$ is selected from the group consisting of $(C_1-C_{10})$alkyl substituted with one —Cl, —Br, —I, —CH=CH, —$CH_2CH$=CH, -epoxide, —OC(O)—CH=CH, —NCO, —C(O)Cl, —C(O)Br, —C(O)-imidazolyl, —$CO_2(C_1-C_3)$alkyl, —$OC(O)CH_2C(O)CH_3$ and —CH=$CR_{10}CO_2(C_1-C_3)$alkyl where $R_{10}$ is H or $CH_3$; and $X^-$ is selected from the group consisting of $[PF_6]^-$, $[NTf_2]^-$, $[BR_5R_6R_7R_8]^-$, $[BF_4]^-$, $OH^-$, $SCN^-$, $SbF_6^-$, $R_9PO_4^-$, $R_9SO_2^-$, $R_9SO_3^-$, $R_9SO_4^-$, $OTf^-$, tris(trifluoromethylsulfonyl)methide, $[N(CN)_2]^-$, $[CH_3CO_2]^-$, $[CF_3CO_2]^-$, $[NO_3]^-$, $Br^-$, $Cl^-$, $I^-$, $[Al_2Cl_7]^-$, $[AlCl_4]^-$, oxalate, dicarboxylates and tricarboxylate, formate, phosphate and aluminate, wherein $R_5$, $R_6$, $R_7$ and $R_8$ are each independently selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl $(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, —SMe and cyano, and wherein $R_9$ is selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$; —SMe and cyano.

In another aspect of the above method, the compound is of the formula:

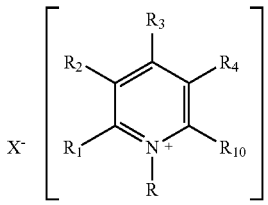

wherein $R_1$, $R_2$, $R_3$, $R_4$ and $R_{10}$ are each independently selected from the group consisting of hydrogen, $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, cyano, —SMe, —$SO_3H$, —$P((C_1-C_5)alkyl)_2$ and —$P(O)(OEt)_2$;

R is selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, cyano, —SMe, —$SO_3H$, —$P((C_1-C_5)alkyl)_2$ and —$P(O)(OEt)_2$; or wherein R, $R_1$, $R_2$, $R_3$, $R_4$ and $R_{10}$ are each independently selected from the group consisting of $(C_1-C_{10})$alkyl substituted with one —Cl, —Br, —I, —CH=CH, —$CH_2CH$=CH, -epoxide, —OC(O)—CH=CH, —NCO, —C(O)Cl, —C(O)Br, —C(O)-imidazolyl, —$CO_2(C_1-C_3)$alkyl, —$OC(O)CH_2C(O)CH_3$ and —CH=$CR_{10}CO_2(C_1-C_3)$alkyl where $R_{10}$ is H or $CH_3$; or wherein at least one of R, $R_1$, $R_2$, $R_3$, $R_4$ and $R_{10}$ is selected from the group consisting of $(C_1-C_{10})$alkyl substituted with one —Cl, —Br, —I, —CH=CH, —$CH_2CH$=CH, -epoxide, —OC(O)—CH=CH, —NCO, —C(O)Cl, —C(O)Br, —C(O)-imidazolyl, —$CO_2(C_1-C_3)$alkyl, —$OC(O)CH_2C(O)CH_3$ and —CH=$CR_{10}CO_2(C_1-C_3)$alkyl where $R_{10}$ is H or $CH_3$; and $X^-$ is selected from the group consisting of $[PF_6]^-$, $[NTf_2]^-$, $[BR_5R_6R_7R_8]^-$, $[BF_4]^-$, $OH^-$, $SCN^-$, $SbF_6^-$, $R_9PO_4^-$, $R_9SO_2^-$, $R_9SO_3^-$, $R_9SO_4^-$, $OTf^-$, tris(trifluoromethylsulfonyl)methide, $[N(CN)_2]^-$, $[CH_3CO_2]^-$, $[CF_3CO_2]^-$, $[NO_3]^-$, $Br^-$, $Cl^-$, $I^-$, $[Al_2Cl_7]^-$, $[AlCl_4]^-$, oxalate, dicarboxylates and tricarboxylate, formate, phosphate and aluminate, wherein $R_5$, $R_6$, $R_7$ and $R_8$ are each independently selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, —SMe and cyano, and wherein $R_9$ is selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, —SMe and cyano.

In another aspect of the above method, the compound is of the formula 5 or 6:

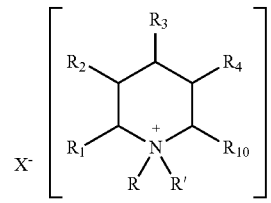

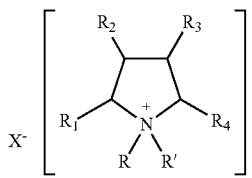

wherein $R_1$, $R_2$, $R_3$, $R_4$ and $R_{10}$ are each independently selected from the group consisting of hydrogen, $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, cyano, —SMe, —$SO_3H$, —$P((C_1-C_5)alkyl)_2$ and —$P(O)(OEt)_2$; or R and R' are independently selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —NH$_2$, —OH, —SH, —NHCH$_3$, —N(CH$_3$)$_2$, cyano, —SMe, —SO$_3$H, —P((C$_1$-C$_5$)alkyl)$_2$ and —P(O)(OEt)$_2$; or wherein at least one of R, R', R$_1$, R$_2$, R$_3$, R$_4$ and R$_{10}$ is selected from the group consisting of $(C_1-C_{10})$alkyl substituted with one —Cl, —Br, —I, —CH═CH, —CH$_2$CH═CH, -epoxide, —OC(O)—CH═CH, —NCO, —C(O)Cl, —C(O)Br, —C(O)-imidazolyl, —CO$_2$(C$_1$-C$_3$)alkyl, —OC(O)CH$_2$C(O)CH$_3$ and —CH═CR$_{10}$CO$_2$(C$_1$-C$_3$)alkyl where R$_{10}$ is H or CH$_3$; and X$^-$ is selected from the group consisting of [PF$_6$]$^-$, [NTf$_2$]$^-$, [BR$_5$R$_6$R$_7$R$_8$]$^-$, [BE$_4$]$^-$, OH$^-$, SCN$^-$, SbF$_6$$^-$, R$_9$PO$_4$$^-$, R$_9$SO$_2$$^-$, R$_9$SO$_3$$^-$, R$_9$SO$_4$$^-$, OTf$^-$, tris(trifluoromethylsulfonyl)methide, [N(CN)$_2$]$^-$, [CH$_3$CO$_2$]$^-$, [CF$_3$CO$_2$]$^-$, [NO$_3$]$^-$, Br$^-$, Cl$^-$, I$^-$, [Al$_2$Cl$_7$]$^-$, [AlCl$_4$]$^-$, oxalate, dicarboxylates and tricarboxylate, formate, phosphate and aluminate, wherein R$_5$, R$_6$, R$_7$ and R$_8$ are each independently selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —NH$_2$, —OH, —SH, —NHCH$_3$, —N(CH$_3$)$_2$, —SMe and cyano, and wherein R$_9$ is selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —NH$_2$, —OH, —SH, —NHCH$_3$, —N(CH$_3$)$_2$, —SMe and cyano.

In another aspect of the above method, the compound is of the formula 7 or 8:

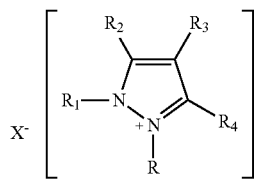

7

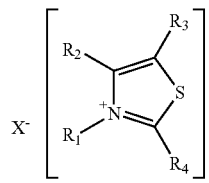

8 wherein:

R is selected from the group consisting of $(C_1-C_5)$alkyl and aryl that may be unsubstituted or substituted by one or two halo, nitro, trifluoromethyl, trifluoromethoxy, methoxy, carboxy, —NH$_2$, —OH, —SH, —NHCH$_3$, —N(CH$_3$)$_2$, cyano, —SMe, —SO$_3$H, —P((C$_1$-C$_5$)alkyl)$_2$ and —P(O)(OEt)$_2$; and R$_1$, R$_2$, R$_3$ and R$_4$ are each independently selected from the group consisting of hydrogen, $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —NH$_2$, —OH, —SH, —NHCH$_3$, —N(CH$_3$)$_2$, cyano, —SMe, —SO$_3$H, —P((C$_1$-C$_5$)alkyl)$_2$ and —P(O)(OEt)$_2$; or wherein at least one of R, R$_1$, R$_2$, R$_3$ and R$_4$ is selected from the group consisting of $(C_1-C_{10})$alkyl substituted with one —Cl, —Br, —I, —CH═CH, —CH$_2$CH═CH, -epoxide, —OC(O)—CH═CH, —NCO, —C(O)Cl, —C(O)Br, —C(O)-imidazolyl, —CO$_2$(C$_1$-C$_3$)alkyl, —OC(O)CH$_2$C(O)CH$_3$ and —CH═CR$_{10}$CO$_2$(C$_1$-C$_3$)alkyl where R$_{10}$ is H or CH$_3$; and X$^-$ is selected from the group consisting of [PF$_6$]$^-$, [NTf$_2$]$^-$, [BR$_5$R$_6$R$_7$R$_8$]$^-$, [BF$_4$]$^-$, OH$^-$, SCN$^-$, SbF$_6$$^-$, R$_9$PO$_4$$^-$, R$_9$SO$_2$$^-$, R$_9$SO$_3$$^-$, R$_9$SO$_4$$^-$, OTf$^-$, tris(trifluoromethylsulfonyl)methide, [N(CN)$_2$]$^-$, [CH$_3$CO$_2$]$^-$, [CF$_3$CO$_2$]$^-$, [NO$_3$]$^-$, Br$^-$, Cl$^-$, I$^-$, [Al$_2$Cl$_7$]$^-$, [AlCl$_4$]$^-$, oxalate, dicarboxylates and tricarboxylate, formate, phosphate and aluminate, wherein R$_5$, R$_6$, R$_7$ and R$_8$ are each independently selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —NH$_2$, —OH, —SH, —NHCH$_3$, —N(CH$_3$)$_2$, —SMe and cyano, and wherein R$_9$ is selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —NH$_2$, —OH, —SH, —NHCH$_3$, —N(CH$_3$)$_2$, —SMe and cyano.

In yet another aspect, each of R, R', R$_0$, R$_1$, R$_2$, R$_3$, R$_4$ and R$_{10}$ independently comprise of a reactive group that bonds the ionic liquid compound onto a polymer. The reactive group may include an alkene, acrylate, isocyanate, acid chloride, epoxide or other functional group that enables bonding to the polymer or other compounds.

According to another aspect of the above method, the compound is of the formula:

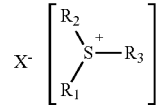

10 wherein R$_1$, R$_2$ and R$_3$ or are each independently selected from the group consisting of hydrogen, $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —NH$_2$, —OH, —SH, —NHCH$_3$, —N(CH$_3$)$_2$, cyano, —SMe, —SO$_3$H, —P((C$_1$-C$_5$)alkyl)$_2$ and —P(O)(OEt)$_2$; and X$^-$ is selected from the group consisting of [PF$_6$]$^-$, [NTf$_2$]$^-$, [BR$_5$R$_6$R$_7$R$_8$]$^-$, [BF$_4$]$^-$, OH$^-$, SCN$^-$, SbF$_6$$^-$, R$_9$PO$_4$$^-$, R$_9$SO$_2$$^-$, R$_9$SO$_3$$^-$, R$_9$SO$_4$$^-$, OTf$^-$, tris(trifluoromethylsulfonyl)methide, [N(CN)$_2$]$^-$, [CH$_3$CO$_2$]$^-$, [CF$_3$CO$_2$]$^-$, [NO$_3$]$^-$, Br$^-$, Cl$^-$, I$^-$, [Al$_2$Cl$_7$]$^-$, [AlCl$_4$]$^-$, oxalate, dicarboxylates and tricarboxylate, formate, phosphate and aluminate, wherein R$_5$, R$_6$, R$_7$ and R$_8$ are each independently selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, —SMe and cyano, and wherein $R_9$ is selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, —SMe and cyano.

In one variation for each of the above compound of formula 1, 2, 3, 4, 5, 6, 7, 8 or 9, at least one of R, R', $R_0$, $R_1$, $R_2$, $R_3$, $R_4$ and $R_{10}$ is selected from the group consisting of $(C_1-C_{10})$alkyl substituted with one —Cl, —Br, —I, —CH=CH, —$CH_2$CH=CH, -epoxide, —OC(O)—CH=CH, —NCO, —C(O)Cl, —C(O)Br, —C(O)-imidazolyl, —$CO_2(C_1-C_3)$alkyl, —OC(O)$CH_2$C(O)$CH_3$ and —CH=C$R_{10}$CO$_2$($C_1-C_3$)alkyl where $R_{10}$ is H or $CH_3$ may be polymerized into polymers to form polymers containing ILs.

In a particular variation of each of the above ILs of formulae 1, 2, 3, 4, 5, 6, 7, 8 and 9, $X^-$ is selected from the group of anions as depicted in FIG. 4.

In another aspect of the above method, the method further comprises contacting or formulating the ionic liquid with a second different ionic liquid. In another aspect of the method, the method further comprises contacting or formulating the material with an ionic liquid in combination with an agent selected from the group consisting of a mineral flame retardant, a halogenated flame retardant, a phosphorus based flame retardant, a nitrogen based flame retardant, a silicon based flame retardants and nanometric particles, and combinations thereof. In yet another aspect of the above method, the material is selected from the group consisting of textile, resins, plastics, rubber, leather, paper and wood products and surface coating formulations.

In another embodiment, there is provided a method for fighting or suppressing fire or forest fire, the method comprises:

a) preparing a flame retardant formulation comprising an ionic liquid compound of the formula:

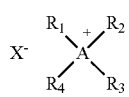

1 wherein A is selected from N, P or S; and wherein
  i) when A is N, each $R_1$, $R_2$, $R_3$ and $R_4$ independently form a double bond with an adjacent $R_1$, $R_2$, $R_3$ or $R_4$ group or are each independently selected from the group consisting of hydrogen, $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, cyano, —SMe, —$SO_3H$, —$P((C_1-C_5)$alkyl$)_2$ and —P(O)(OEt)$_2$; or wherein $R_1$, $R_2$ and $R_3$ together with N form a heteroaromatic or $R_1$ and $R_2$ together with N form a heterocyclic ring each unsubstituted or substituted by a group selected from halo, nitro, trifluoromethyl, trifluoromethoxy, methoxy, carboxy, —$NH_2$, —OH, —SH, —$NHCH_3$, —$N(CH_3)_2$, —SMe, cyano, $(C_1-C_3)$alkyl, aryl, $(C_3-C_6)$cycloalkyl, aryl$(C_1-C_3)$alkyl and heteroaryl; provided that when the material is a clay, $R_1$, $R_2$, $R_3$ and $R_4$ are not hydrogen, straight chain unsubstituted $(C_1-C_{20})$alkyl nor combined with N to form a pyrrolidinium ring or piperidinium ring;

ii) when A is S, $R_1$, $R_2$, $R_3$ and $R_4$ are each independently selected from the group consisting of hydrogen, $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, cyano, —SMe, —$SO_3H$, —$P((C_1-C_5)$alkyl$)_2$ and —P(O)(OEt)$_2$; and iii) when A is P, $R_1$, $R_2$, $R_3$ and $R_4$ are each independently selected from the group consisting of hydrogen, $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, cyano, —SMe, —$SO_3H$, —$P((C_1-C_5)$alkyl$)_2$ and —P(O)(OEt)$_2$; or wherein at least one of R, $R_1$, $R_2$, $R_3$, $R_4$ and $R_{10}$ is selected from the group consisting of $(C_1-C_{10})$alkyl substituted with one —Cl, —Br, —I, —CH=CH, —$CH_2$CH=CH, -epoxide, —OC(O)—CH=CH, —NCO, —C(O)Cl, —C(O)Br, —C(O)-imidazolyl, —$CO_2(C_1-C_3)$alkyl, —OC(O)$CH_2$C(O)$CH_3$ and —CH=C$R_{10}$CO$_2$($C_1-C_3$)alkyl where $R_{10}$ is H or $CH_3$;

b) optionally mixing the composition with a high viscosity gum thickener or other flame retardants;

c) optionally further mixing the ionic liquid compound with water; and d) applying the formulation to the fire.

In one variation of the above ILs, $X^-$ is selected from the group of anions as depicted in FIG. 4.

In another embodiment, there is provided a flame retardant or flame resistant material comprising an effective amount of a flame retardant composition comprising an ionic liquid of the formula:

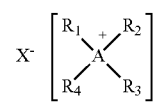

1 wherein A is selected from N, P or S; and wherein
  i) when A is N, each $R_1$, $R_2$, $R_3$ and $R_4$ independently form a double bond with N and an adjacent $R_1$, $R_2$, $R_3$ or $R_4$ group or are each independently selected from the group consisting of hydrogen, $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, cyano, —SMe, —$SO_3H$, —$P((C_1-C_5)$alkyl$)_2$ and —P(O)(OEt)$_2$; or wherein $R_1$, $R_2$ and $R_3$ together with N form a heteroaromatic or $R_1$ and $R_2$ together with N form a heterocyclic ring each unsubstituted or substituted by a group selected from halo, nitro, trifluoromethyl, trifluoromethoxy, methoxy, carboxy, —$NH_2$, —OH, —SH, —$NHCH_3$, —$N(CH_3)_2$, —SMe, cyano, ($C_1$-$C_3$) alkyl, aryl, ($C_3$-$C_6$)cycloalkyl, aryl($C_1$-$C_3$)alkyl and heteroaryl; provided that when the material is a clay, $R_1$, $R_2$, $R_3$ and $R_4$ are not hydrogen, straight chain unsubstituted ($C_1$-$C_{20}$)alkyl nor combined with N to form a pyrrolidinium ring or piperidinium ring;

ii) when A is S, $R_1$, $R_2$, $R_3$ and $R_4$ are each independently selected from the group consisting of hydrogen, ($C_1$-$C_{20}$)alkyl, aryl, ($C_3$-$C_{10}$)heterocyclyl, ($C_3$-$C_{10}$)cycloalkyl, ($C_3$-$C_{10}$)heterocyclyl($C_1$-$C_8$)alkyl, aryl($C_1$-$C_8$)alkyl, heteroaryl and heteroaryl($C_1$-$C_8$)alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, cyano, —SMe, —$SO_3H$, —P(($C_1$-$C_5$)alkyl)$_2$ and —P(O)(OEt)$_2$; and iii) when A is P, $R_1$, $R_2$, $R_3$ and $R_4$ are each independently selected from the group consisting of hydrogen, ($C_1$-$C_{20}$)alkyl, aryl, ($C_3$-$C_{10}$)heterocyclyl, ($C_3$-$C_{10}$)cycloalkyl, ($C_3$-$C_{10}$)heterocyclyl($C_1$-$C_8$)alkyl, aryl($C_1$-$C_8$)alkyl, heteroaryl and heteroaryl($C_1$-$C_8$)alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, cyano, —SMe, —$SO_3H$, —P(($C_1$-$C_5$)alkyl)$_2$ and —P(O)(OEt)$_2$; or wherein at least one of $R_1$, $R_2$, $R_3$ and $R_4$ is selected from the group consisting of ($C_1$-$C_{10}$)alkyl substituted with one —Cl, —Br, —I, —CH=CH, —$CH_2$CH=CH, -epoxide, —OC(O)—CH=CH, —NCO, —C(O)Cl, —C(O)Br, —C(O)-imidazolyl, —$CO_2$($C_1$-$C_3$)alkyl, —OC(O)$CH_2$C(O)$CH_3$ and —CH=C$R_{10}$$CO_2$($C_1$-$C_3$) alkyl where $R_{10}$ is H or $CH_3$;

provided that:
a) when A is P, then $R_1$, $R_2$, $R_3$ and $R_4$ are not all hydroxymethyl;
b) when A is N or S, $X^-$ is selected from the group consisting of [$PF_6$]$^-$, [$NTf_2$]$^-$, [$BR_5R_6R_7R_8$]$^-$, [$BF_4$]$^-$, OH$^-$, SCN$^-$, $SbF_6^-$, $R_9PO_4^-$, $R_9SO_2^-$, $R_9SO_3^-$, $R_9SO_4^-$, OTf$^-$, tris(trifluoromethylsulfonyl)methide, [N(CN)$_2$]$^-$, [$CH_3CO_2$]$^-$, [$CF_3CO_2$]$^-$, [$NO_3$]$^-$, Br$^-$, Cl$^-$, I$^-$, [$Al_2Cl_7$]$^-$, [$AlCl_4$]$^-$, oxalate, dicarboxylates and tricarboxylate, formate, phosphate and aluminate, wherein $R_5$, $R_6$, $R_7$ and $R_8$ are each independently selected from the group consisting of ($C_1$-$C_{20}$)alkyl, aryl, ($C_3$-$C_{10}$)heterocyclyl, ($C_3$-$C_{10}$)cycloalkyl, ($C_3$-$C_{10}$)heterocyclyl($C_1$-$C_8$) alkyl, aryl($C_1$-$C_8$)alkyl, heteroaryl and heteroaryl ($C_1$-$C_8$)alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, —SMe and cyano, and wherein $R_9$ is selected from the group consisting of ($C_1$-$C_{20}$)alkyl, aryl, ($C_3$-$C_{10}$)heterocyclyl, ($C_3$-$C_{10}$)cycloalkyl, ($C_3$-$C_{10}$)heterocyclyl($C_1$-$C_8$)alkyl, aryl($C_1$-$C_8$)alkyl, heteroaryl and heteroaryl($C_1$-$C_8$) alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, —SMe and cyano;

c) when A is N and at least one of $R_1$, $R_2$, $R_3$ and $R_4$ is —$CH_3$, then the material does not comprise of a clay; and d) when A is P, then $X^-$ is selected from the group consisting of [$PF_6$]$^-$, [$NTf_2$]$^-$, [$BR_5R_6R_7R_8$]$^-$, [$BF_4$]$^-$, OH$^-$, SCN$^-$, $SBF_6^-$, $R_9PO_4^-$, $R_9SO_3^-$, $R_9SO_4^-$, OTf$^-$, tris(trifluoromethylsulfonyl)methide, [N(CN)$_2$]$^-$, [$CH_3CO_2$]$^-$, [$CF_3CO_2$]$^-$, [$NO_3$]$^-$, [$Al_2Cl_7$]$^-$, [$AlCl_4$]$^-$, oxalate, dicarboxylate and tricarboxylate, formate, phosphate, I$^-$ and aluminate, wherein $R_5$, $R_6$, $R_7$ and $R_8$ are each independently selected from the group consisting of ($C_1$-$C_{20}$)alkyl, aryl, ($C_3$-$C_{10}$)heterocyclyl, ($C_3$-$C_{10}$)cycloalkyl, ($C_3$-$C_{10}$)heterocyclyl($C_1$-$C_8$)alkyl, aryl($C_1$-$C_8$)alkyl, heteroaryl and heteroaryl($C_1$-$C_8$)alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, —SMe and cyano, and $R_9$ is selected from the group consisting of ($C_1$-$C_{20}$)alkyl, aryl, ($C_3$-$C_{10}$)heterocyclyl, ($C_3$-$C_{10}$)cycloalkyl, ($C_3$-$C_{10}$) heterocyclyl($C_1$-$C_8$)alkyl, aryl($C_1$-$C_8$)alkyl, heteroaryl and heteroaryl($C_1$-$C_8$)alkyl group that may be unsubstituted or substituted by one or two halo, nitro, trifluoromethyl, trifluoromethoxy, methoxy, carboxy, —$NH_2$, —OH, —SH, —$NHCH_3$, —$N(CH_3)_2$, —SMe and cyano; and provided that when the material is a resin and at least one of $R_1$, $R_2$, $R_3$ and $R_4$ is a —(CH$_2$)$_n$— group where n is 1 to 18, then $X^-$ is not $SBF_6^-$, $PF_6^-$, $BF_4^-$, $AlF_6^{3-}$, $CF_3SO_3^-$, $AsF_6^-$, B[$C_6F_5$]$_4^-$, B[$C_6H_3$($C_6H_3$($CF_3$)$_2$]$_4^-$, B[$C_6H_5$]$_4^-$, $TiF_6^{2-}$, $TiCl_5^-$, $SnCl_5^-$, $GeF_6^{2-}$, $SiF_6^{2-}$, $NiF_6^{2-}$ or $ZrF_6^{2-}$.

In one variation of the above ILs, $X^-$ is selected from the group of anions as depicted in FIG. 4. In another variation of the above, the ILs are selected from the group illustrated in FIGS. 1, 2 and 3, wherein $X^-$ is as defined above.

In one aspect of the flame retardant material, the material is selected from the group consisting of textile, fabric, resin, plastic, rubber, leather, paper and wood products. In another aspect of the above fabric, the fabric comprises synthetic fibers selected from the group consisting of nylon, polyacrylates, polyesters and polyamides and combinations thereof. In one variation of the above textile or fabric may be a natural or synthetic textile or fabric. In another aspect of the above, the flame retardant composition further comprises of an additive selected from the group consisting of softening agent, stain repellant agents and combinations thereof. In one aspect, the flame resistant fabric provides a fabric characterized by an after flame time, as defined by ASTM D 6413 12 seconds ignition test, of less than 2 seconds. Test Method D 6413 has been adopted from Federal Test Standard No. 191A. This test method determines the response of textiles to a standard ignition source, deriving measurement values for after flame time, afterglow time, and char length. The vertical flame resistance, as determined by this test method, relates to a specified flame exposure and application time.

In another aspect, there is provided a method of preparing a flame retardant or resistant fabric as provided above, wherein the fabric comprises cellulosic fibers in about 10% to 99% by weight, synthetic fibers in about 1% to about 30% by weight, and the ionic liquid composition comprises of less than 5% by weight of the fabric, the method comprising:

1) contacting the fabric with a composition comprising one or more ionic liquid flame retardant composition comprising the formulae of the present application for a sufficient amount of time to allow the ionic liquid to penetrate the fabric;

2) curing the fabric at a temperature of about 100° C. to 300° C. for a sufficient amount of time to impregnate the ionic liquid onto the fabric.

In another variation of the above flame retardant or resistant material, the material is a polymer selected from the group consisting of a thermoplastic, phenolics, polycarbonates, polyurethanes, polyesters, polyethylene, polypropylene, polyacrylic acid, butadiene/acrylonitrile-acrylonitrile/styrene copolymers, ethylene-vinyl acetate copolymers, polyamides, acrylic resisn and epoxy resins. In another variation of the above material, the material is a coating composition, a film, a composite material, an adhesive and a sealing composition.

In one variation there is provided a method of imparting a flame retarding property to a material comprising treating said material with an effective flame retarding amount of the composition of the formulas above in combination with a metal hydroxide, hydroxyl carbonate, borates the like.

In another variation there is provided a method of imparting a flame retarding property to a material comprising treating said material with an effective flame retarding amount of the composition of the formulas above combined with a organic flame retardant. In another variation, there is provided a method of imparting a flame retarding property to a material comprising treating said material with an effective flame retarding amount of the composition of the formulas above combined with a halogenated flame retardant. In another variation there is provided a method of imparting a flame retarding property to a material comprising treating said material with an effective flame retarding amount of the composition of the formulas above combined with halogenated flame retardant additives, halogenated monomers and copolymers which are reactive flame retardants, and the like.

In yet another variation there is provided a method of imparting a flame retarding property to a material comprising treating said material with an effective flame retarding amount of the composition of the formulas above combined with a phosphorus based flame retardant. In another variation, there is provided a flame retardant composition comprising an ionic liquid combined with red phosphorus, inorganic phosphorus, organic phosphorus based compounds, intumescent flame retardant systems and the like.

In a particular variation, there is provided a method of imparting a flame retarding property to a material comprising treating said material with an effective flame retarding amount of the composition of the formulas above combined with a nitrogen based flame retardant. In yet another variation, there is provided a method of imparting a flame retarding property to a material comprising treating said material with an effective flame retarding amount of the composition of the formulas above combined with silicon based flame retardants. In another variation, there is provided a method of imparting a flame retarding property to a material comprising treating said material with an effective flame retarding amount of the composition of the formulas above combined with silicones, silica and the like.

In another variation there is provided a method of imparting a flame retarding property to a material comprising treating said material with an effective flame retarding amount of the composition of the formulas above combined with nanometric particles. In a particular variation, there is provided a method of imparting a flame retarding property to a material comprising treating said material with an effective flame retarding amount of the composition of the formulas above combined with a nanoclay, carbon nanotubes, nanoscale particulate additives.

In another variation there is provided a method of imparting a flame retarding property to a material comprising treating said material with an effective flame retarding amount of the composition of the formulas above also functioning as a dispersant. In another variation there is provided a method of imparting a flame retarding property to a material comprising treating said material with an effective flame retarding amount of the composition of the formulas above also functioning as a plasticizer.

In a variation there is provided a method of imparting a flame retarding property to a material comprising treating said material with an effective flame retarding amount of the composition of the formulas above also functioning as an antibacterial. In another variation there is provided a method of imparting a flame retarding property to a material comprising treating said material with an effective flame retarding amount of the composition of the formulas above also functioning as a lubricant. In yet another variation there is provided a method of imparting a flame retarding property to a material comprising treating said material with an effective flame retarding amount of the composition of the formulae above that also function as an anti-corrosion agent.

In one aspect, the ionic liquid flame retardant compositions of the invention maybe derived from biofeedstock such as carbohydrates, amino acids, fatty acids, nucleotides and other organic and inorganic chemicals derived from biofeedstock.

Compounds of this invention, or derivatives thereof, may possess a reactive function such as an alkene, acrylate, isocyanate, acid chloride, epoxide or other functional group that enables bonding to other compounds and polymers and imparts flame retarding properties to said compounds and polymers.

In addition to the exemplary embodiments, aspects and variations described above, further embodiments, aspects and variations will become apparent by reference to the drawings and figures and by examination of the following descriptions.

DETAILED DESCRIPTION OF THE INVENTION

Definitions:

Unless specifically noted otherwise herein, the definitions of the terms used are standard definitions used in the chemical arts. Exemplary embodiments, aspects and variations are illustratived in the figures and drawings, and it is intended that the embodiments, aspects and variations, and the figures and drawings disclosed herein are to be considered illustrative and not limiting.

In one variation, the group that is an alkyl, aryl, heterocyclyl, ($C_1$-$C_8$)cycloalkyl, hetrocyclyl($C_1$-$C_8$)alkyl, aryl($C_1$-$C_8$)alkyl, heteroaryl or heteroaryl($C_1$-$C_8$)alkyl group may be substituted or unsubstituted.

An "alkyl" group is a straight, branched, saturated or unsaturated, aliphatic group having a chain of carbon atoms, optionally with oxygen, nitrogen or sulfur atoms inserted between the carbon atoms in the chain or as indicated. A ($C_1$-$C_{20}$)alkyl, for example, includes alkyl groups that have a chain of between 1 and 20 carbon atoms, and include, for example, the groups methyl, ethyl, propyl, isopropyl, vinyl, allyl, 1-propenyl, isopropenyl, ethynyl, 1-propynyl, 2-propynyl, 1,3-butadienyl, penta-1,3-dienyl, penta-1,4-dienyl, hexa-1,3-dienyl, hexa-1,3,5-trienyl, and the like. An alkyl group may also be represented, for example, as a —(CR$^1$R$^2$)$_m$— group where R$^1$ and R$^2$ are independently hydrogen or are independently absent, and for example, m is 1 to 8, and such representation is also intended to cover both saturated and unsaturated alkyl groups.

An alkyl as noted with another group such as an aryl group, represented as "arylalkyl" for example, is intended to be a straight, branched, saturated or unsaturated aliphatic divalent group with the number of atoms indicated in the alkyl group (as in (C$_1$-C$_{20}$)alkyl, for example) and/or aryl group (as in (C$_5$-C$_{14}$)aryl, for example) or when no atoms are indicated means a bond between the aryl and the alkyl group. Nonexclusive examples of such group include benzyl, phenethyl and the like.

An "alkylene" group is a straight, branched, saturated or unsaturated aliphatic divalent group with the number of atoms indicated in the alkyl group; for example, a —(C$_1$-C$_3$)alkylene- or —(C$_1$-C$_3$)alkylenyl-.

A "cyclyl" such as a monocyclyl or polycyclyl group includes monocyclic, or linearly fused, angularly fused or bridged polycycloalkyl, or combinations thereof. Such cyclyl group is intended to include the heterocyclyl analogs. A cyclyl group may be saturated, partially saturated or aromatic.

The term "cellulose" or "cellulose fiber" generally refers to a fiber composed of, or derived from, cellulose, a main component of the cell walls of plants. Examples of cellulose or cellulosic fibers include cotton, rayon, linen, jute, hemp and cellulose acetate.

The term "flame resistant" is used to describe a material that burns slowly or that is self-extinguishing after removal of an external source of ignition. For example, as the term relates to fabric or textiles, a fabric or yarn may be flame resistant because of the innate properties of the fiber, the fabric construction, or the presence of flame retardant compounds or formulations applied to the fabric.

The term "flame retardant" or "flame retardant compound" as it relates to textiles or fabric, refers to a compound that may be applied as a topical treatment to a fiber, fabric, or other textile item during processing to reduce its flammability. In some aspects, flame retardant chemicals are applied to the already constructed fabric substrate to produce a flame resistant fabric.

"Halogen" or "halo" means fluorine, chlorine, bromine or iodine.

A "heterocyclyl" or "heterocycle" is a mono-cycloalkyl or bi-cycloalkyl wherein one or more of the atoms forming the ring or rings is a heteroatom that is a N, O, or S. Nonexclusive examples of heterocyclyl include piperidyl, 4-morpholyl, 4-piperazinyl, pyrrolidinyl, 1,4-diazaperhydroepinyl, 1,3-dioxanyl, and the like. In one aspect, the heterocyclyl may also include carbohydrate-based compounds, such as glucose. Accordingly, the ILs of the present application includes sugar-derived ILs, including glucose-derived ILs. Such glucose derived ILs include 1,5-anhydro-2,3,4-tri-O-methyl-D-glucitol-6-O-triethylammonium trifluoromethanesulfonate, 1,5-anhydro-2,3,4-tri-O-methyl-D-glucitol-6-O-diethylsulfonium trifluoromethanesulfonate and 1,5-anhydro-2,3,4-tri-O-methyl-D-glucitol-6-O-tetrahydrothiophenyl trifluoromethanesulfonate.

Salts include acid addition salts formed with inorganic acids such as hydrochloric acid, hydrobromic acid, sulfuric acid, phosphoric acid, and the like; or with organic acids such as acetic acid, propionic acid, hexanoic acid, malonic acid, succinic acid, malic acid, citric acid, gluconic acid, salicylic acid and the like.

"Substituted or unsubstituted" or "optionally substituted" means that a group such as, for example, alkyl, aryl, heterocyclyl, (C$_1$-C$_8$)cycloalkyl, hetrocyclyl(C$_1$-C$_8$)alkyl, aryl (C$_1$-C$_8$)alkyl, heteroaryl, heteroaryl(C$_1$-C$_8$)alkyl, and the like, unless specifically noted otherwise, may be unsubstituted or, may substituted by 1, 2 or 3 Substituents selected from the group such as halo, nitro, trifluoromethyl, trifluoromethoxy, methoxy, carboxy, —NH$_2$, —OH, —SH, —NHCH$_3$, —N(CH$_3$)$_2$, —SMe, cyano and the like.

In one embodiment, the ILs of the present application may be racemic compounds or may be chiral substantially enantiomeric or diastereomeric pure or mixtures thereof.

The present disclosure may be understood by reference to the following detailed description taken in conjunction with the drawings described below.

To replace brominated flame retardants and other chemical compounds that may have toxic bioaccumulative effects; a different class of materials, namely ionic liquids ("IL"), may be used for the purpose of flame retarding.

An ionic liquid is a salt in which the ions are poorly coordinated as is well known in the art. At least one ion in the salt has a delocalized charge and one component is organic, which prevents the formation of a stable crystal lattice.

Ionic liquids have capabilities to form a wide range of intermolecular interactions that include strong and weak ionic, hydrogen boding, van der Waals, dispersive, pie-pie interactions. Ionic liquids exhibit compatibility with a wide variety of materials including salts, fats, proteins, amino acids, surfactants, oils, inks and plastics, and even DNA. Ionic liquids have been intensively studied for many applications, such as solvents, catalysts, separation, extraction, biomass processing, etc. ILs have been used as plasticizers, dispersants, and lubricants. When used as plasticizers, they show excellent resistance to migration and leaching which mitigates one of the most significant issues with current flame retardant compounds.

Ionic liquid flame retardants may be suitably configured by selection of cations and anions chosen from, but not limited to, those shown in FIGS. 1, 3 and 4.

Ionic liquids are compounds which may contain halogen, nitrogen, phosphorus, sulfur, or some combination of these elements. Ionic liquid compounds may be designed with halogen, nitrogen, sulfur, phosphorus or some combinations of these elements, and so the compounds may be used as flame retardants, either though physical action or chemical action to inhibit combustion processes as discussed above.

Due to the large number of possible combinations of ion pairs, the ability to select the physical and chemical properties of possible ionic liquid flame retardants is essentially unlimited. Functionalization of a ligand or "head", such as by changing the length of a ligand R group, adding a ligand to different positions of a head, and/or adding a halogen to a ligand or head further increases the number of possible ionic liquid flame retardants. The head may be defined as the positively charged core atom or ring of the cation species of the ionic liquid.

In one embodiment, ionic liquids are modified to design biodegradable and nontoxic ionic liquids via incorporation of ethereal side chains. One such example is shown in FIG. 2. Greener Solvents; Room Temperature Ionic Liquids from Biorenewable Sources, Scott Handy, Chem. Eur. J. 2003, 9, 2938-2944.

In another embodiment incorporation of reactive groups into ligands, produces ionic liquids which may be chemically bound with a substrate to impart flame retarding properties to substrates. Five such examples are shown in FIG. 3. Other reactive groups may include, but are not limited to hydroxyl and/or carboxyl groups.

In another embodiment, ionic liquids may be formulated with other ionic liquids, or traditional flame retardants or additives. These traditional flame retardants can be mineral flame retardants, halogen containing flame retardants, phosphorous based flame retardants, nitrogen based flame retardants, silicon based flame retardants, nanometric particles, etc. Mineral flame retardants can be metal hydroxides, hydroxycarbonates, borates, etc.; halogen containing flame retardants can be halogen flame retardant additives, reactive halogenated flame retardant monomers or polymers; phosphorous based flame retardants can be red phosphorous, inorganic phosphate, organic phosphorous based compounds, etc.; silicon based flame retardants can be silicon, silica compounds, etc.; nanometric particles can be nanoclay, carbon nanotube, nanoscale particulate additives, etc.

Ionic liquids may also be used as multifunctional additives. For example, an ionic liquid may be used as a lubricant and flame retardant, a plasticizer and flame retardant, a dispersant and flame retardant, and an antibacterial agent and flame retardant.

The proposed flame retardants can be used in many fields including plastics, textiles, paper, leather, wood, etc. In addition, the flame retardants of the present application can also be used as flame retardants for fighting forest fires.

EXAMPLES

The materials and reagents used are either available from commercial suppliers or are prepared by methods well known to a person of ordinary skill in the art, following procedures described in such references as *Fieser and Fieser's Reagents for Organic Synthesis*, vols. 1-17, John Wiley and Sons, New York, N.Y., 1991; *Rodd's Chemistry of Carbon Compounds*, vols. 1-5 and supps., Elsevier Science Publishers, 1989; *Organic Reactions*, vols. 1-40, John Wiley and Sons, New York, N.Y., 1991; March J.: *Advanced Organic Chemistry*, 4th ed., John Wiley and Sons, New York, N.Y.; and Larock: *Comprehensive Organic Transformations*, VCH Publishers, New York, 1989.

Figure 1:
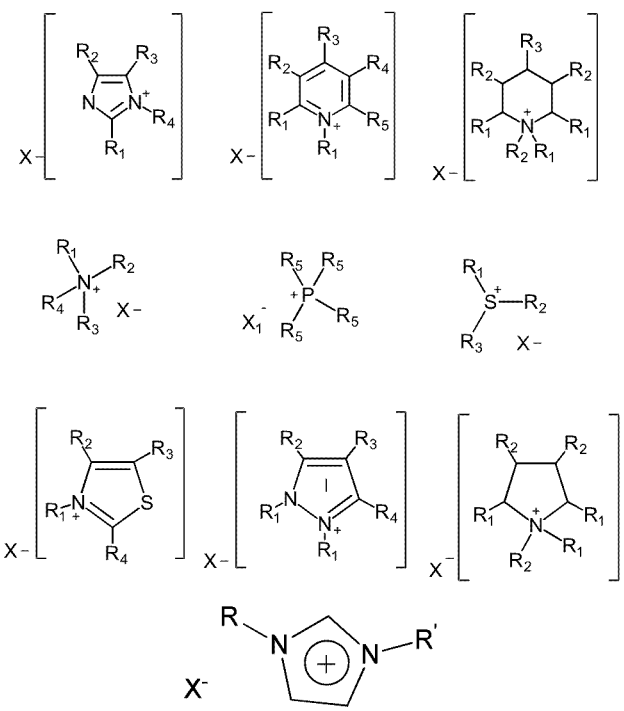
FIG. 1 provides a list of representative ILs depicted in Formula I, including cyclic and acyclic ILs. In one variation, R and R' are each independently selected from the group consisting of ($C_1$-$C_{20}$)alkyl (including —$CH_3$, —$CH_2CH_3$, -allyl, -propargyl, etc . . . ), aryl, ($C_3$-$C_{10}$)heterocyclyl, ($C_3$-$C_{10}$)cycloalkyl, ($C_3$-$C_{10}$)heterocyclyl($C_1$-$C_8$)alkyl, aryl ($C_1$-$C_8$)alkyl, heteroaryl and heteroaryl($C_1$-$C_8$)alkyl group that may be unsubstituted or substituted by one or two halo, nitro, trifluoromethyl, trifluoromethoxy, methoxy, carboxy, —$NH_2$, —OH, —OR, —SH, —$NHCH_3$, —$N(CH_3)_2$, cyano, —SMe, —$Si(OR)_3$, —$SO_3^-$, —$SO_3H$, —$CO_2R$, —$P((C_1$-$C_5)alkyl)_2$ and —$P(O)(OEt)_2$, wherein R is ($C_1$-$C_{20}$)alkyl, ($C_3$-$C_{10}$)cycloalkyl and aryl. In one embodiment of Formula I, —$R_1$, $R_2$, $R_3$, $R_4$ and $R_5$ are each independently hydrogen, ($C_1$-$C_{20}$)alkyl (e.g., —$CH_3$, —$CH_2CH_3$ etc), aryl, ($C_3$-$C_{10}$)heterocyclyl, ($C_3$-$C_{10}$)cycloalkyl, ($C_3$-$C_{10}$)heterocyclyl($C_1$-$C_8$)alkyl, aryl($C_1$-$C_8$)alkyl, heteroaryl and heteroaryl($C_1$-$C_8$)alkyl, unsubstituted or substituted as defined herein; and $X^-$=$X_1^-$ and are as defined herein.
Figure 2:
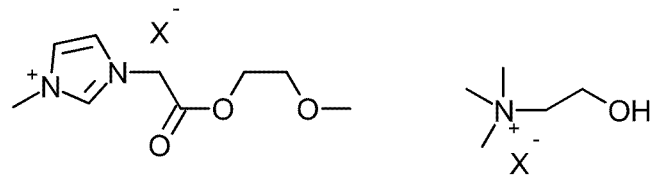
FIG. 2 illustrates examples of cyclic and acyclic ILs, including an imidazolium IL and a choline based IL. In one embodiment of FIG. 2, $X^-$ is as defined herein.
Figure 3:
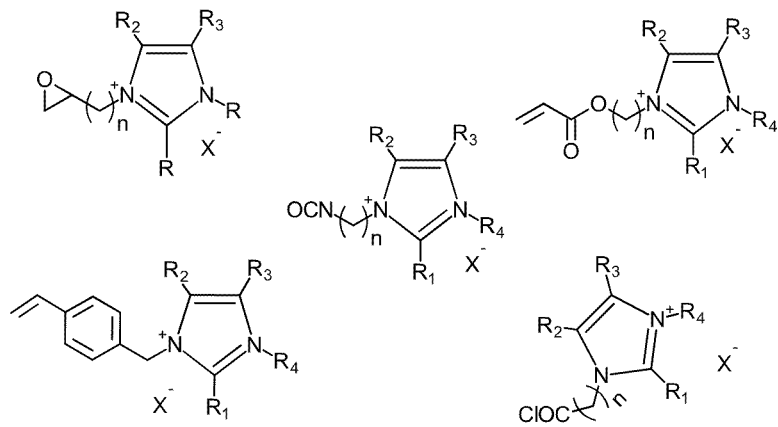
FIG. 3 provides representative examples of heterocyclic ILs, including imidazolium ILs monomers that have functional groups. In one embodiment, n is 1-5; R, $R_1$, $R_2$, $R_3$ and $R_4$ are each independently hydrogen, ($C_1$-$C_{20}$)alkyl, aryl, ($C_3$-$C_{10}$)heterocyclyl, ($C_3$-$C_{10}$)cycloalkyl, ($C_3$-$C_{10}$)heterocyclyl($C_1$-$C_8$)alkyl, aryl($C_1$-$C_8$)alkyl, heteroaryl and heteroaryl($C_1$-$C_8$)alkyl, unsubstituted or substituted; and $X^-$ is as defined herein.
Figure 4:
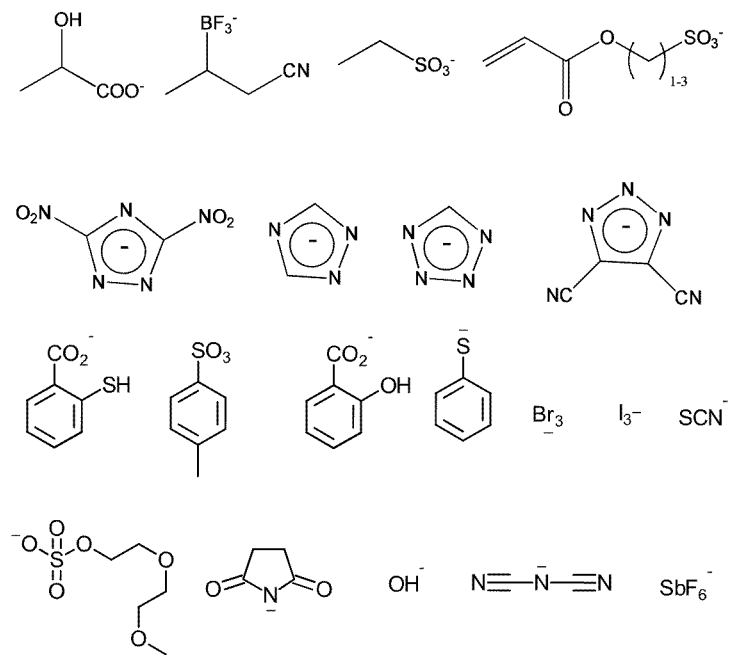
FIG. 4 provides a list of representative examples of the anion $X^-$ of the ILs. $X^-$ anions may also include: $[PF_6]^-$, $[NTf_2]^-$, $[BR_1R_2R_3R_4]^-$, $[BF_4]^-$, $R_2PO_4^-$, $RSO_3^-$, $RSO_4^-$, $OTf^-$, $[N(CN)_2]^-$, $[CH_3CO_2]^-$, $[CF_3CO_2]^-$, $[NO_3]^-$, $Br^-$, $Cl^-$, $I^-$, $[Al_2Cl_7]^-$, $[AlCl_4]^-$, $[(CF_3SO_2)_2N]$—, $[(C_2F_5SO_2)_2N]$—, $[CF_3SO_3]$—, $[CF_3BF_3]$—, $[(C_2F_5)_3PClF_2]$—, $[(C_2F_5)_3\ PF_3]$—, $[(C_3F_7)_3BF_3]$—, $[(C_3F_7)_3PClF_2]$—, $[(C_4F_9)_3PClF_2]$—, $[(C_4F_9)_3SO_3]$—, HS—$(CH_2)_{1-3}SO_3$— and $[NiCl_3]$—; oxalate, dicarboxylates and tricarboxylate, formate, phosphate and aluminate.

In one embodiment, ionic liquids of the present application are further modified by the incorporation with ethereal side chains to provide biodegradable and nontoxic ionic liquids. One such example is shown in FIG. 2. Greener Solvents; Room Temperature Ionic Liquids from Biorenewable Sources, Scott Handy, Chem. Eur. J. 2003, 9, 2938-2944.

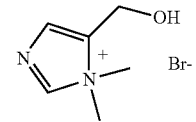

11

Hydroxymethyl imidazolium ionic liquid derivatives may be synthesized from fructose according to the method reported by Totter and Handy in Room Temperature Ionic Liquids: Different Classes and Physical Properties; Scott Handy; Current Organic Chemistry, 2005, 9, 959-988; Organic Letter, 2003, Vol. 5, No. 14, pp 2513-2515, Handy et al; Organic Syntheses, Coll. Vol. 3, p. 460 (1955); Vol. 24, p. 64 (1944), Totter et al.

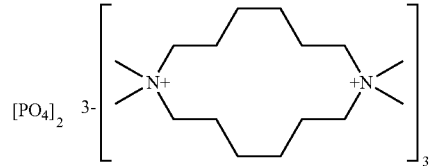

12

The cyclic diaminophosphate compound above may be prepared according to chemistry described by Lall et al in Chem. Comm., 2000, 2413-2414.

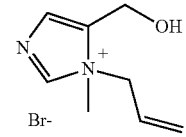

13

The allyl imidazolium bromide may be prepared according to chemistry described by Liu et al in Science of China, Series B: Chemistry, 2006, 149, 1, 385-401.

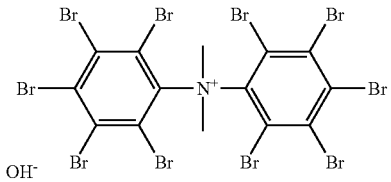

The brominated biphenylammonium compound above may be prepared by methylation of the brominated biphenylamine described in Czech patent 233407 titled, "Preparation of brominated diphenyl amines as fire proofing agents."

Treatment of Polymers and Resins with IL Flame Retardants:

In one example of polymers containing ILs, the polymer may comprise of about 80 to 99.9 weight percent of the composition that is blended with the IL, and optionally, additive, as provided herein. In one variation, the polymer is a polyolefin. In one variation of the polymer composition, the polyolefin is selected from polypropylene and polyethylene, such as isotactic, atactic and syndiotactic polypropylene, HDPE, LDPE and LLDPE, random and heterophasic copolymers of propylene, ethylene, butene, hexene and octane. In another variation, the polymer is selected from at least one of polyesters, epoxy resins, ABS combinations, halogenated polymers, polyethylene, polystyrene, silicones, silicone rubbers, ethyl vinyl acetate, and their copolymers.

In one aspect of the present application, the polymer is a resin. Such resin may include thermoplastic resin, thermoset resin, thermoplastic resin blend or thermoset resin blend. In one variation, the resin may be selected from polycarbonates, polyamides, polyesters, blends of polycarbonates with other polymers, polyphenylene ether, polyphenyleneoxide, blends of polyphenylene ether with styrenics, blends of polyphenyleneoxide with styrenic materials, polyaramids, polyimides, styrenic materials, polyacrylates, styrene-acrylonitrile resins, halogenated plastics, polyketones, polymethylmethacrylate (PMMA), thermoplastic elastomers, cellulosics, rayon or polylactic acid. In another variation, the polymer employed may be polycarbonates, polycaprolactam, polylauryllactam, polyhexamethyleneadipamide, polyhexamethylenedodecanamide, blends of Nylons with other polymers, polybutylene terephthalate, polyethylene terephthalate, polyethylene naphthalate, polycarbonate-acrylonitrile-butadiene-styrene blends, polycarbonate-polybutylene terephthalate blends, polyphenylene ether, polyphenyleneoxide, polyphenylene sulfide, polyether sulphone, polyethylene sulfide, acrylonitrile-butadiene-styrene, polystyrene, styrene-acrylonitrile resins, polyvinyl chloride, fluoroplastics, polymethylmethacrylate, thermoplastic urethanes, thermoplastic vulcanizates, or styrene ethylene butylene styrene copolymer.

The resins of may be uncured resins that have no curing agent, semi-cured resins or cured resins. In a particular variation, the amount of the IL that may be incorporated into the resins of the present application may be about 0.01 to about 30% by weight, about 0.01 to about 20% by weight %, about 0.01 to about 10% by weight or about 0.01 to about 5% by weight.

EVA Copolymers:

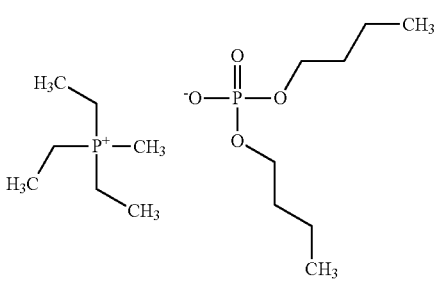

Treatment of ethylene-vinyl acetate (EVA) copolymer with Triethylmethylphosphonium dibutyl phosphate:

EVA (80 g), IL 19 (3 g), low melting glass (5 g) and ATH (alumina trihydrate, 12 g) are mixed, melt blended in a Thermo Haake Rheomix with a screw speed of 60 rpm, and the mixing time is 15 min for each sample. The mixed samples are transferred to a mold and preheated at 180° C. for 5 min and then pressed at 15 MPa, followed by cooling the samples to room temperature while maintaining the pressure for 5 min.

Thermosets with ILs:

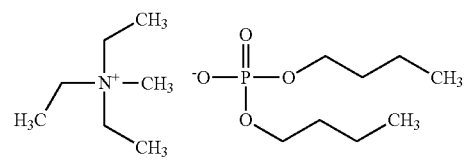

Phenolic resin (80 g), IL 20 (3 g), glass flake (5 g) and ATH (12 g) are mixed and compounded in a similar manner as described above. The polymers prepared according to the above procedure are found to have flame retardant properties.

Thermoplastics Containing ILs:

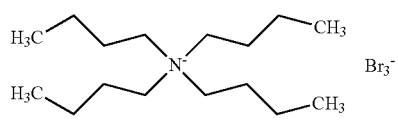

Polybutylene terephthalate (90 g), IL 21 (7 g), antimony trioxide (3 g) are mixed and extruded in a similar manner as described above. The polymers obtained according to the above procedure are found to have flame retardant properties.

Polycarbonate Polymers with IL:

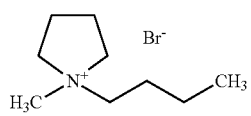

Polycarbonate (90 g), IL 22 (5 g), silicon (3 g) and SnCl$_2$ (2 g) are mixed and extruded in a similar manner as described above. The polymers obtained according to the above procedure are found to have flame retardant properties.

Incorporation of Functionalized ILs into Polymers:

ILs monomers that have functional groups such as —Cl, —Br, —I, —CH═CH, —CH$_2$CH═CH, -epoxide, —OC(O)—CH═CH, —NCO, —C(O)Cl, —C(O)Br, —C(O)-imidazolyl, —CO$_2$(C$_1$-C$_3$)alkyl, —OC(O)CH$_2$C(O)CH$_3$ and —CH═CR$_{10}$CO$_2$(C$_1$-C$_3$)alkyl where R$_{10}$ is H or CH$_3$ may be polymerized into polymers to form polymers containing ILs. For example, ILs containing ethylene oxide groups may be polymerized by initiation with different agents such as postassium t-butoxide in a solvent, such as DMF.

Functionalized ILs Modified Rubber: The modified rubber may be a rubber phase polymer in a matrix containing functionalized ILs. The modified rubber may be prepared by polymerizing the functionalized IL with various rubbers. The modified rubber may be prepared by standard methods such as emulsion polymerization, suspension polymerization, bulk polymerization and by extrusion of a graft copolymer resin and a functionalized IL. The polymerization method employed may provide the modified rubber in about 50% to 90% by weight. In one embodiment, the functionalized ILs may be employed in about 1% to about 30% by weight with the rubber polymer in about 50% to about 95% by weight. Optionally, a copolymerizable polymer may be added in an amount of about 10% to about 30% by weight. Suitable polymers that may be employed include polybutadiene, poly(styrene-butadiene), polyacrylonitrile-butadiene), isoprene rubbers; acrylic rubbers such as polybutyl acrylic acid; and ethylene-propylene rubbers and terpolymers of ethylene-propylene-diene (EPDM). Other copolymers that may be employed in the process include acrylonitrile, methacrylonitrile, acrylic acid, methacrylic acid, maleic anhydride and N-substituted maleimide. Other vinyl monomers may be used include α-methylstyrene and p-methylstyrene. Additional modified rubber resins may include acrylonitrile-butadiene-styrene (ABS), copolymer resins of acrylonitrile-acrylic rubber-styrene (AAS) and copolymer resins of acrylonitrile-ethylenepropylene rubber-styrene (AES).

In one example, 90 g of butadiene rubber latex powder, 5 g of a selected functionalized IL, 10 g of acrylonitrile and 150 g of deionized water are mixed together. To the mixture is added 0.4 g cumen hydroperoxide and 0.01 ferrous sulfate hydrate. The mixture is heated at about 75 to 85° C. for about 5 hours. The mixture is coagulated to obtain a modified rubber polystyrene resin in a powder form.

In one embodiment, the flame retarding resins may also contain a filler for improving the physical and mechanical properties of the resins. In one aspect, the filler may include glass fibers, glass flakes, glass beads, glass powders, carbon fibers, carbon flakes, talc, mica, kaolin, montmorillonite, bentonite, sepiolite, xonotlite, clay, silica, titanium oxide, carbon black, organic fillers and combinations thereof.

A resin containing ILs of the present application may be prepared as follows. A mixture of the epoxide 20a in about 5% to 10% by weight, and an elastomer, about 80 to 95% by weight, containing at least acrylonitrile butadiene rubber containing a carboxyl group, and a hardening accelerator such as an organic phosphine or a phosphonium salt is combined and mixed. Optionally, aluminum hydroxide (0.1% to 5% by weight) and a filler (1% to about 5% by weight) containing talc may be added to the mixture. The mixture may be heated to a temperature of about 180° C. to 270° C. with agitation to form the desired resin. The resulting composition provides a resin that is shown to be flame resistant and the resin has sufficient flexibility and may be used effectively as an electrical insulator. The resin composition prepared according to the method may be used as adhesive insulation that is flame resistant or as printed circuit boards that are flame resistant.

Optionally, other resin additives, including polytrimethylene terephthalate based compounds such as polyethylene terephthalate, polybutylene terephthalate or nylon may be used as a resin additive in the above process to form various fibers and resins containing ILs that are flame resistant.

Incorporation of ILs with Clays:

The clay nanomaterials may be assembled with ILs using macro-scale assembly processes, such as the layer-by-layer (LBL) assembly methods. The method involves the alternating deposition of components from dilute solutions or discpersions on a suitable substrate, including inorganic molecular clusters, nanoparticles, nanotubes and nanowires, nanoplates, dendrimers and clay nanosheets. See for example, P. T. Hammond, Adv. Mater. 16 (2004) 1271. The method allows the formation of multi-functional thin films.

In one example, a mixture of an IL may be combined with a synthetic clay, such as hectorite (Laponite RD) to grow several hundred-nanometers thick films. In certain aspect, the clay may be a montmorillonite or a saponite. Standard layered silicates may also be employed as the clays. The resulting film provides a highly uniform surface coverage of the IL on the substrate, and may form clay multilayers. The nature of the final sheets may depend on various parameters employed, including the adsorption time, the concentration of the IL in the misture, the amount of clay in the dispersion and the pH of the aqueous solution. Thin films of clays and ILs may also be prepared using the traditional dipping method (or dip coating method) or the monolayer deposition method as known in the art. According to the methods, formation of individual nanosheets may be used as flexible fabric, wherein the fabrics are incorporated with flame retardants.

A flame retardant montmorillonite clay may be prepared by modification of a sodium montmorillonite clay with the epoxide 20a by an ion exchange reaction. Optionally, surface functionalization may be performed by grafting with an epoxide group containing a silane compound. The resulting flame retardant clay may be added to an epoxy resin and thermally cured to form various epoxy nanocomposites that are flame retardant.

Similarly, a flame retardant montmorillonite clay may be prepared by modification of a sodium montmorillonite clay with the IL 20b by an ion exchange reaction. The resulting flame retardant clay may be added to an epoxy resin and thermally cured to form various epoxy nanocomposites that are flame retardant.

Molding composition containing ILs may also be prepared. A mixture of a hardener for an epoxy resin, such as phenolic novolak resin, the epoxide 20a (about 5% to 10% by weight) and a quaternary organophosphonium satlt for

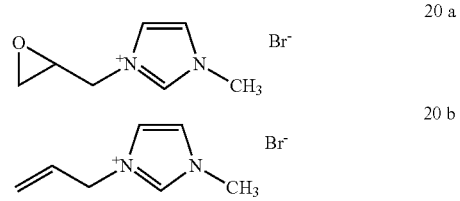

catalyzing a reaction between the epoxy resin, the hardener and the epoxide 20a. The resulting mixture may be heated to form the flame retardant molding composition that may be used for coating electronic devices.

Flame resistant polyurethanes may be prepared by mixing the epoxide 20a (about 500 g) with diglyme (500 mL) and about 0.5% KOH. The resulting mixture is heated under vacuum, and propylene oxide (495 g) is added. A polyether polyol from bisphenol A, diethanolamine, formaldehyde, propylene oxide and a glycerol-based polyether polyol is added. Mixing and curing the resulting composition at elevated temperatures provide a foam polyurethane having flame resistant properties.

The preparation of nanocomposites comprising ILs may be performed using various methods, including the solvent intercalation route that employs swelling the layered silicates in ILs to promote the diffusion of the ILs in the clay interlayer spacing, or the melt intercalation process which is based on polymer processing in the molten state such as extrusion. See for example, Sinha Ray S, Maiti P, Okamoto M, Yamada K, Ueda K. New polylactide/layered silicate nanocomposites. 1. Preparation, characterization and properties. Macromolecules 2002; 35:3104-10; and Tanoue S, Hasook A, Iemoto Y, Unryu T. Preparation of poly(lactic acid)/poly(ethylene glycol)/organoclay nanocomposites by melt compounding. Polym Compos 2006; 27:256-63, which is incorporate herein in their entirety.

Compounding Treatment of Polyoxymethylene with 1-Butyl-3-methylimidazolium bromide and aluminum hydroxide:

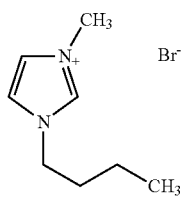

15

Aluminum hydroxide power (5 gm) is premixed with ionic liquid 15 (95 gm), then mixed with polyoxymethylene pellets (900 gm), and then melt-blended by a twin screw extruder at 170-185° C. with a screw rotation speed of 150-180 rpm. The extruded pellets are molded into standard bars for combustibility and mechanical performance tests through an injection-molding machine with a plasticizing temperature of 170-195° C.

Compounding treatment of polypropylene with intumescent flame retarding system using triethylmethylphosphonium dibutyl phosphate ≥97.0% (CH).

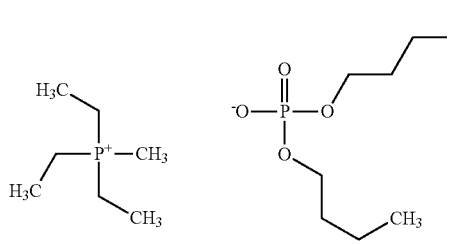

16

A mixture of ionic liquid 16 (2 gm), pentaerythritol (carbonization agent) (5 gm) and melamine (3 gm) are premixed and then mixed with polypropylene (90 gm). The mixture is then melt-blended by a twin screw extruder at 200° C. with a screw rotation speed of 150-180 rpm. The extruded pellets are molded into standard bars for combustibility and mechanical performance tests through an injection-molding machine with a plasticizing temperature of 230° C.

Treatment of PVC Using IL 15 with Antimony Trioxide:

A mixture of IL 15 (5 gm) and antimony trioxide (2 gm) are premixed, and then mixed with polyvinyl chloride resin (93 gm). The mixture is blended and molded into required shape and dimension in a similar manner as disclosed above.

Treatment of PVC Using IL 14 and Traditional Brominated Flame Retardant Tetrabromobisphenol A:

A mixture of IL 14 (3 gm), TBBPA (3 gm) are premixed, and mixed with PVC resin (94 gm). The mixture is blended and molded into required shape and dimension in a similar manner as disclosed above.

Treatment of high density polyethylene (HDPE) with ionic tributylmethylphosphonium methyl carbonate liquid modified clay:

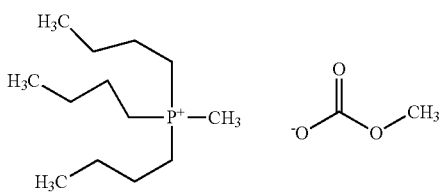

17

The surface of the clay is modified with ionic liquids through ion exchange reaction. HDPE (97 gm) and IL 17 modified clay (3 gm) are mixed, melt blended in Thermo-Haake Rheomix with a screw speed of 60 rpm, and the mixing time for each sample is 15 min. The mixed samples are transferred to a mold and preheated at 180° C. for 5 min and then pressed at 15 MPa followed by cooling them to room temperature while maintaining the pressure for 5 min.

Treatment of polyimide 6 with ionic liquid/carbon nanotubes or ionic liquid/carbon nanofibers using 1-butylpyridinium bromide:

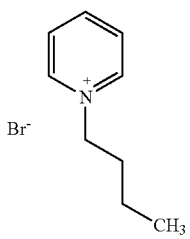

18

A mixture of IL 18 (3 gm) and carbon nanotubes or nanofibers (2 gm) are premixed, and then melt-blended and molded in a similar manner as disclosed above. Treatment of polystyrene via in-situ polymerization method:

A mixture of styrene (95 g), IL 15 (5 g), AIBN (0.2 g) is prepared. The mixture is stirred magnetically under nitrogen at room temperature until a homogenous mixture is formed. The mixture is heated at 90° C. for pre-polymerization until a critical viscosity of the mixture is reached. The mixture was then transferred to an oven and kept isothermally at 60° C. for 24 h and then at 80° C. for 20 h. A copolymer containing IL is obtained.

Application IL Flame Retardants as a Components of Coating or Paint Layers:

Ionic liquid flame retardant 16 (5 g) is mixed with 250 ml of paint and coating materials. The resulting material is used as a heat resistant or flame resistant coating on potentially flammable surfaces. Heating of the coated materials shows that the materials are heat resistant or flame resistant to about 455° C. The coating composition may include those formulated form modified epoxy ester resin coating, modified silicone-alkyd resin coating, specially modified silicone acrylic resin and modified silicone acrylic.

The polymers containing the ILs prepared according to the methods above, for example provides significantly improved UL94 test characteristics.

Flame Retarding Finishing of Cotton Textile Materials:

Flammable fabrics may be treated to minimize burning hazards. One such treatment involve fiber copolymerization wherein one or more fiber monomers that are flammable are combined and copolymerized with fire retardant fibers, resulting in improved properties of the fabric. In one aspect, the fire or flame retardant fibers are treated or impregnated with ionic liquids (IL) of the present application. In another aspect, the IL may be introduced onto the fibers or fabrics using chemical post treatment method by coating the fabric or by the introduction of the IL into the fabric by impregnating the fabric with the IL during the dyeing of the fabric. According to these methods, the IL are bound to the fabric and do not readily migrate from the fabric into the environment.

Cationic softening agents—such as one or more of polyolefins, modified polyolefins, ethoxylated alcohols, ethoxylated ester oils, alkyl glycerides, fatty acid derivatives, fatty imidazolines, paraffins, halogenated waxes, and halogenated esters—are used instead to impart softness to the treated fabric. A single softening agent or a combination of different softening agents may be used.

Stain and water repellant agents of the present application may include fluoropolymers, waxes, silicones and polysiloxanes, hydrophobic resins, commercially available fluoropolymers and combinations thereof.

Coating of the ionic liquid flame retarding composition according to the present method allows the coating composition to retain its properties without flaking or melting even after exposure to heat or fire. The coating composition also provides fabrics that are durable for multiple launderings.

In certain embodiments for the use of the flame retardants on fabrics, softeners may be used and may include polydimethylsiloxane, aminosiloxane and quarternary silicone softeners.

A finishing aqueous solution containing 7% by weight IL flame retardant 11 is prepared. The cotton fleece is first immersed in the solution, then passed through a laboratory padder with two dips and two nips, dried at 90° C. for 3 min 45 s, and finally cured in a Mathis oven at 170° C. for 4 min.

Flame Retarding Finishing of Leather Materials:

A finishing aqueous solution containing 7% by weight flame retardant 16 is prepared. The finishing of leather can be done in a similar manner as used in textile finishing.

Flame Retarding Treatment of Wood:

An aqueous impregnation solution is prepared containing 7% by weight IL 16. Test panels are prepared on A angustifolia. The impregnations are carried out at 201° C. in a vertical Pressure vessel of 25l capacity, provided with a vacuum pump and an air compressor. In all the cases, the vessel is loaded with the test panels to be impregnated; then the pressure is reduced by 400 mmHg for 30 min to remove air and vapor from the wood cells. The impregnants are added at the reduced pressure. After about 5 minutes, the pressure is gradually increased until a final pressure of 4780 mmHg (6.5 kgcm$^2$) to facilitate the penetration; this stage lasts for 120 min. Next, the pressure is reduced to a light vacuum (approximately 50 mmHg for 10 min) to eliminate the excess of solution. Finally, the test panels are removed and rinsed with distilled water.

Flame Treatment of Paper:

An aqueous finishing solution containing 7% by weight IL 16 is prepared. The paper is treated by soaking the samples in the finishing solution for 10 min. The excess solution is removed by pressing the samples between two roll mills of a manually operated wringer.

Wild Fire Protection:

Flame Retardant Preparation

For a representative demonstration, triethylammonium phosphate was employed as a simple analogue of choline phosphate. Triethylammonium phosphate was prepared from reacting triethylamine and phosphoric acid at a 3:1 molar ratio. The retardant solution was used without further characterization.

Sample Preparation

Small ginkgo tree branch samples of approximately equivalent size were taken from University of the Colorado at Boulder campus. All samples were oven dried at 120° C. for 24 hours. Branch samples were soaked in the triethylammonium phosphate flame retardant solution for 5 seconds. Then the samples were taken out of the solution, and hung in still air for 20 minutes to remove excess retardant solution. The samples were then further dried for another 24 hours at room temperature. Controlled sample using pure water treatment were prepared and dried in the same way.

Flammability Test

Figure 5:
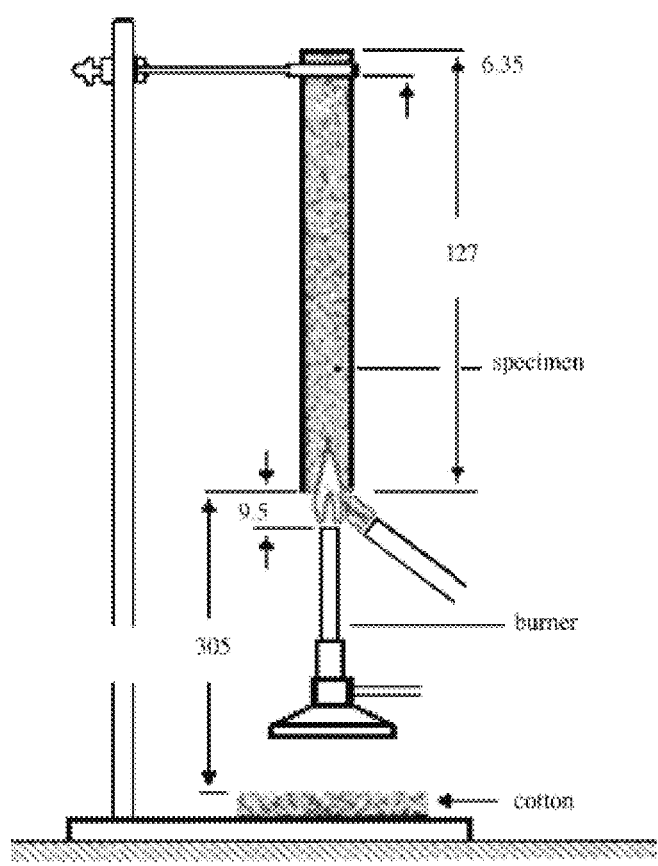
FIG. 5 is a depiction of an apparatus for conducting a flammability test.

UL 94V, a simple test of vertical combustion, is employed for flammability testing. The corresponding experimental device is shown in FIG. 5. The burner was controlled to produce a blue flame with a 20 mm high central cone and a power of 50 W. The flame was applied to the bottom of the sample and the top of the burner was located at 10 mm from the bottom edge of the sample. The flame is applied for 10 seconds and removed. The after flame time t1 (the time required for the flame to extinguish) is noted. After extinction, the flame is applied for another 10 seconds. The after flame time t2 is noted, together with the afterglow time t3 (the time required for the fire glow to disappear).

TABLE 1

After flame times of treated and control samples

| After Flame Time | TEAP Treated Sample | Control Sample |
| --- | --- | --- |
| T1 | 3 s | 6 s |
| T2 | 3 s | 7 s |
| T3 | 1 s | 324 s |

As is apparent from these experiments, the after flame time of samples treated with triethylammonium phosphate is significantly shorter than those of the control samples, which clearly show the capacity and efficiency of ammonium phosphate ionic liquids as effective flame retardants.

Flame Retardants for Fighting Forest Fires:

50 weight % mixture of IL 12 is prepared and sprayed in a controlled forest area containing evergreens such as pines, spruces and fir trees and shrubs for demonstrating the effectiveness of the use of IL for fire protection for wild forest fires. The controlled burn area was ignited, allowed to burn for about 3 minutes, and the IL prepared according to the procedures provided herein were sprayed over the fire. The active fire was extinguished almost immediately and the unburned evergreens were protected from any residual flames. In one variation of the procedure, the IL may be mixed with water and high viscosity gum thickeners to form the IL flame retardant. Optionally, colorant such as an off-white color or red iron oxide may be added.

In another example, the IL may be combined with ammonium polyphosphate, diammonium phosphate, monoammonium phosphate, attapulgus clay, guar gum or a derivative of guar gum, and combinations thereof to form the IL composition for treating forest fires. In another example, the IL of the present application may be mixed or combined with commercial fire or flame retardants such as PHOS-CHEK D75 to provide a highly effective fire retardant composition. Such high viscosity composition provides accurate drop characteristics and highly effective penetration through forest canopy.

While a number of exemplary embodiments, aspects and variations have been provided herein, those of skill in the art will recognize certain modifications, permutations, additions and combinations and certain sub-combinations of the embodiments, aspects and variations. It is intended that the following claims are interpreted to include all such modifications, permutations, additions and combinations and certain sub-combinations of the embodiments, aspects and variations are within their scope.

What is claimed is:

1. A flame retardant or flame resistant material, wherein said flame retardant or flame resistant material comprises 80 to 99.9% by weight a base material, and wherein said flame retardant or flame resistant material further comprises 0.01 to about 20% by weight of a flame retardant composition that is homogenously dispersed within said flame retardant or flame resistant material, wherein said flame retardant composition comprises an ionic liquid having the formula:

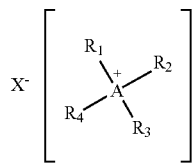

wherein A is P; and wherein
each $R_1$, $R_2$, $R_3$ and $R_4$ is independently selected from the group consisting of ($C_1$-$C_5$)alkyl, and $C_6$-$C_7$ aryl;
$X^-$ is $(R_9)_2PO_4^-$, and wherein $R_9$ is selected from the group consisting of ($C_1$-$C_5$)alkyl and $C_6$-$C_7$ aryl;
wherein the base material is acrylate polymer,
wherein the presence of said ionic liquid renders said flame retardant or flame resistant material flame retardant or flame resistant compared to the same base material in the absence of said ionic liquid;
wherein the flame retardant or flame resistant material has UL94 flammability rating of at least V2.

2. The flame retardant or flame resistant material of claim 1, wherein the ionic liquid having the formula 19:

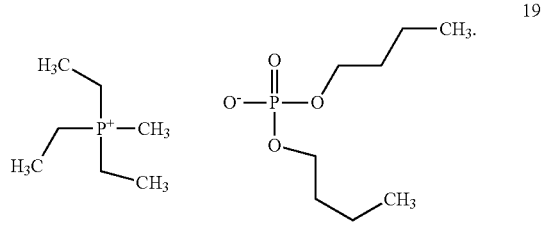

3. A method for increasing flame retardant or flame resistant in a base material, said method comprising: providing an ionic liquid in said base material to obtain a flame retardant or flame resistant material comprising from about 0.01 to about 20% by weight of the ionic liquid, wherein the presence of said ionic liquid renders said flame retardant or flame resistant material flame retardant or flame resistance compared to the same base material in the absence of said ionic liquid;
wherein the ionic liquid having the formula:

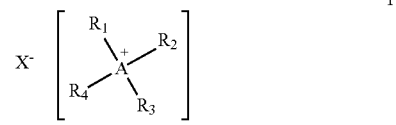

wherein A is N or P; and wherein
each $R_1$, $R_2$, $R_3$ and $R_4$ is independently selected from the group consisting of ($C_1$-$C_5$)alkyl and $C_6$-$C_7$ aryl;
$X^-$ is $(R_9)_2PO_4^-$, $R_9SO_3^-$, or $R_9SO_4^-$, and wherein $R_9$ is selected from the group consisting of ($C_1$-$C_5$)alkyl and $C_6$-$C_7$ aryl;
wherein the base material is polymer selected from the group consisting of phenolics, polycarbonates, polyurethanes polyesters, polyethylene, polypropylene, polyacrylate, ethylene-vinyl acetate copolymers, polyamides, epoxy resins, polyvinylchloride resin, and polymethylmethacrylate,
wherein the flame retardant or flame resistant material has UL94 flammability rating of at least V2.

4. The method of claim 3 further comprising adding traditional non-halogenated flame retardant to said flame retardant or flame resistant material, wherein said traditional non-halogenated flame retardant is selected from the group consisting of a mineral flame retardant, a phosphorus based flame retardant, a nitrogen based flame retardant, a silicon based flame retardants and nanometric particles, and combinations thereof.

5. The method of claim 3, wherein the ionic liquid having the formula 19 or 20:

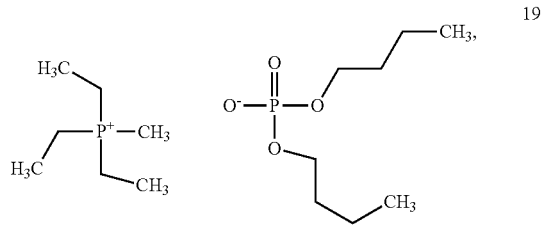

6. The method of claim 3, wherein the ionic liquid having the formula 19:
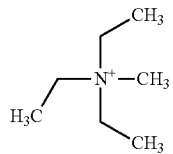 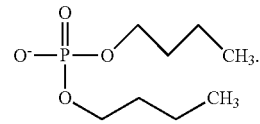
7. The method of claim 3, wherein the base material is acrylate polymer.
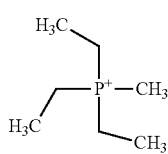 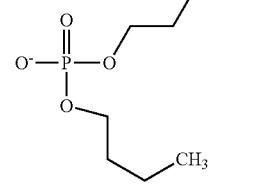
* * * * *